US011609990B2

(12) United States Patent
Miller et al.

(10) Patent No.: US 11,609,990 B2
(45) Date of Patent: *Mar. 21, 2023

(54) POST-TRAINING DETECTION AND IDENTIFICATION OF HUMAN-IMPERCEPTIBLE BACKDOOR-POISONING ATTACKS

(71) Applicant: Anomalee Inc., State College, PA (US)

(72) Inventors: David Jonathan Miller, State College, PA (US); George Kesidis, State College, PA (US)

(73) Assignee: Anomalee Inc., State College, PA (US)

( * ) Notice: Subject to any disclaimer, the term of this patent is extended or adjusted under 35 U.S.C. 154(b) by 401 days.

This patent is subject to a terminal disclaimer.

(21) Appl. No.: 17/002,286

(22) Filed: Aug. 25, 2020

(65) Prior Publication Data

US 2020/0387608 A1 Dec. 10, 2020

Related U.S. Application Data

(63) Continuation-in-part of application No. 16/885,177, filed on May 27, 2020, now Pat. No. 11,514,297.

(Continued)

(51) Int. Cl.
*G06N 3/04* (2023.01)
*G06F 21/56* (2013.01)
(Continued)

(52) U.S. Cl.
CPC .......... *G06F 21/564* (2013.01); *G06F 21/554* (2013.01); *G06F 21/568* (2013.01); *G06N 3/008* (2013.01); *G06N 3/04* (2013.01)

(58) Field of Classification Search
CPC ....... G06N 3/0454; G06N 3/0481; G06N 3/08
(Continued)

(56) References Cited

U.S. PATENT DOCUMENTS

2020/0184036 A1* 6/2020 Wu .................... G06F 21/62
2020/0380118 A1* 12/2020 Miller ............... G06F 21/577
(Continued)

FOREIGN PATENT DOCUMENTS

WO 2014/137416 9/2014

OTHER PUBLICATIONS

Biggio, B., Corona, I., Majorca, D., Nelson, B., Srndic, N., Laskov, P., Giacinto, G., and Roli, F. (2013)Evasion attacks against machine learning at test time. In Proc. ECMLPKDD.
(Continued)

*Primary Examiner* — Emmanuel Bayard
(74) *Attorney, Agent, or Firm* — Mark D. Spiller

(57) ABSTRACT

This patent concerns novel technology for detecting backdoors of neural network, particularly deep neural network (DNN), classifiers. The backdoors are planted by suitably poisoning the training dataset, i.e., a data-poisoning attack. Once added to input samples from a source class (or source classes), the backdoor pattern causes the decision of the neural network to change to a target class. The backdoors under consideration are small in norm so as to be imperceptible to a human, but this does not limit their location, support or manner of incorporation. There may not be components (edges, nodes) of the DNN which are dedicated to achieving the backdoor function. Moreover, the training dataset used to learn the classifier may not be available. In one embodiment of the present invention which addresses such challenges, if the classifier is poisoned then the backdoor pattern is determined through a feasible optimization process, followed by an inference process, so that both the backdoor pattern itself and the associated source class(es) and target class are determined based only on the classifier parameters and a set of clean (unpoisoned attacked) samples
(Continued)

from the different classes (none of which may be training samples).

17 Claims, 8 Drawing Sheets

Related U.S. Application Data

(60) Provisional application No. 62/854,078, filed on May 29, 2019.

(51) Int. Cl.
 *G06F 21/55* (2013.01)
 *G06N 3/008* (2023.01)
(58) Field of Classification Search
 USPC .......................................... 375/141; 706/20
 See application file for complete search history.

(56) References Cited

U.S. PATENT DOCUMENTS

2020/0387608 A1* 12/2020 Miller ................... G06F 21/577
2021/0089941 A1* 3/2021 Chen ........................ G06N 5/04

OTHER PUBLICATIONS

Carlini, N. and Wagner, D. (2017)Towards Evaluating the Robustness of Neural Networks. In Proc. IEEE Symposium on Security and Privacy.
Chen, X., Liu, C., Li, B., Lu, K., and Song, D. (2017)Targeted backdoor attacks on deep learning systems using data poisoning.
Chen, B., Carvalho, W., Baracaldo, N., Ludwig, H., Edwards, B., Lee, T., Malloy, I., and Srivastava, B. (2018) Detecting backdoor attacks on deep neural networks by activation clustering.
Gao, Y., Xu, C., Wang, D., Chen, S., Ranasinghe, D., and Nepal, S.Strip: A Defence Against Trojan Attacks on Deep Neural Networks.
Goodfellow, I., Shlens, J., and Szegedy, C. (2015)Explaining and harnessing adversarial examples.In Proc. ICLR.
Guo, W., Wang, L., Xing, X., Du, M., and Song, D. (2019)TABOR: A Highly Accurate Approach to Inspecting and Restoring Trojan Backdoors in AI Systems.
Hampel, F.R. (1974) The influence curve and its role in robust estimation. Journal of the American Statistical Association 69.
Huang, L., Joseph, A., Nelson, B., Rubinstein, B., and Tygar, J. (2011)Adversarial machine learning. In Proc. 4th ACM Workshop on Artificial Intelligence and Security (AISec).
Liao, C., Zhong, H., Squicciarini, A., Zhu, S., and Miller, D. (Aug. 2018)Backdoor embedding in convolutional neural network models via invisible perturbation.
Liu, K., Doan-Gavitt, B., and Garg, S. (2018)Fine-Pruning: Defending Against Backdoor Attacks on Deep Neural Networks. In Proc RAID.
Miller, B., Kantchelian, A., Afroz, S., Bachwani, R., Dauber, E., Huang, L., Tschantz, M.C., Joseph, A.D., and Tygar, J.D. (2014) Adversarial Active Learning. In Proc. Workshop on Artificial Intelligence and Security (AISec), Scottsdale, Arizona.
Miller, D.J., and Wang, Y., and Kesidis, G. (2018) Anomaly Detection of Attacks (ADA) on DNN Classifiers at Test Time. Neural Computation.
Papernot, N., McDaniel, P., Jha, S., Fredrikson, M., Celik, Z., and Swami, A. (2016)The limitations of deep learning in adversarial settings. In Proc. 1st IEEE European Symp. on Security and Privacy.
Szegedy, C., Zaremba, W., Sutskever, I., Bruna, J., Erhan, D., Goodfellow, I., and Fergus, R. (2014)Intriguing properties of neural networks. In Proc. ICLR.
Tran, B., Li, J., and Madry, A. (2018)Spectral signatures in backdoor attacks. In Proc. NIPS.
Wang, B., Yao, Y., Shan, S., Li, H., Viswanath, B., Zheng, H., and Zhao, B. (2019) Neural Cleanse: Identifying and Mitigating Backdoor Attacks in Neural Networks In Proc. IEEE Symposium on Security and Privacy.
IARPA TrojAI: Trojans in Artificial Intelligence. https://www.iarpa.gov/index.php/research-programs/trojai/trojai-baa, 2019.
Xiang, Z., Miller, D.J., and Kesidis, G. (2019) A Benchmark Study of Backdoor Data Poisoning Defenses for Deep Neural Network Classifiers and a Novel Defense. Proc. IEEE MLSP, Pittsburgh.
Xiang, Z., Miller, D.J., and Kesidis, G. (2019) Revealing Backdoors, Post-Training, in DNN Classifiers via Novel Inference on Optimized Perturbations Inducing Group Misclassification.
Xiao, H., Biggio, B., Nelson, B., Xiao, H., Eckert, C., Roli, F. (2015) Support vector machines under adversarial label contamination. Neurocomputing 160(C):53-62.

* cited by examiner

POST-TRAINING DETECTION AND IDENTIFICATION OF HUMAN-IMPERCEPTIBLE BACKDOOR-POISONING ATTACKS

RELATED APPLICATION

This application is a continuation-in-part application of pending U.S. patent application Ser. No. 16/885,177 filed on 27 May 2020 by inventors David Jonathan Miller and George Kesidis, entitled "Post-Training Detection and Identification of Human-Imperceptible Backdoor-Poisoning Attacks" (Attorney Docket No. ANOM-002-US-NP), which claims benefit of U.S. Provisional Patent Application No. 62/854,078, by inventors David Jonathan Miller and George Kesidis, entitled "Unsupervised Anomaly Detection of Backdoors in DNNs, Post-Training, via Group Model-Inversion to Target Class Detection Statistics," filed 29 May 2019 (Attorney Docket No. ANOM-002-US-PR). The contents of both of the above-referenced applications are hereby incorporated by reference.

BACKGROUND

Field of the Invention

This disclosure generally relates to adversarial learning. More specifically, this disclosure relates to determining whether a machine-learned decision-maker, particularly a Deep (very large) Neural Network (DNN) classifier, has been trained with backdoor poisoned samples (e.g., via samples that include an embedded backdoor perturbation/pattern so small as to be nearly imperceptible to a possible human observer and hence not easily detected). The detection inference is made without having any access to the (possibly poisoned) training set that was used to train the DNN. The detector determines whether or not the DNN was backdoor data-poisoned. Moreover, if a detection is made, the associated source class(es) and target class are identified and the backdoor pattern is estimated.

Related Art

Machine-learning techniques facilitate building models based on sample data (e.g., "training data") that can then be used to make predictions or decisions. Machine learning techniques are becoming increasingly used in a wide variety of applications, such as email filtering and computer vision, in which leveraging conventional techniques to perform a given task is difficult or infeasible. Analysis performed upon the sample data determines a set of trends and/or underlying characteristics that are then used to configure and train a classifier that can then be used to label and/or categorize new sets of (non-training) data.

However, because such techniques leverage automated analysis and generation of models, they can be vulnerable to data poisoning. Backdoor data-poisoning attacks seek to embed patterns that are not noticeable to humans but can subtly change the decision behavior of classifiers to suit the goals of an attacker. Such attacks may leverage a huge variety of possible backdoor patterns, making the detection of backdoor data poisoning very challenging.

Hence, what is needed are techniques and systems for detecting backdoor poisoning in a classifier without the problems of existing approaches.

SUMMARY OF THE INVENTION

As machine-learned decision-makers, in particular Deep Neural Network (DNN) classifiers (also sometimes called "AIs"), have become commercialized in different safety and security sensitive application domains, attacks have been developed to target them. Data poisoning (DP) attacks introduce "poisoned" samples into the training data. DP attacks can be either targeted or indiscriminate. For targeted attacks, the attacker succeeds when misclassification is induced from the "source" class to the "target" class, both specified by the attacker. For indiscriminate attacks, the objective is simply to induce misclassification.

Recently, a new form of backdoor DP attack was proposed. Under such attacks, training samples are altered by the addition of an innocuous, imperceptible backdoor pattern (e.g., for image domains, small perturbations of some pixels' intensity values) and by altering the supervising label from the original (source class) label to a different target class label. If the classifier learns a backdoor mapping, (test) patterns containing the backdoor pattern will be classified to the target class with high probability. Backdoor attacks may be particularly harmful because a successful attack does not degrade the performance of the classifier on "clean" patterns, so they are undetectable by ordinary validation procedures. Moreover, the knowledge and cost required for an adversary to launch backdoor attacks can be as little as possessing a few legitimate patterns, along with the capability to contribute to (to poison) the training set that will be used. For a simple but not limiting example, to attack a street sign (image) classifier, one may poison the training data by simply inserting a few images of stop signs with a yellow square backdoor pattern and labeling them as speed limit signs. After training, the corrupted classifier can recognize normal stop signs with high accuracy. But when faced with a stop sign with a yellow square sticker (applied by the adversary), the classifier will, with high probability, incorrectly decide it is a speed limit sign. Though an image-classification embodiment is described in the following description, backdoor attacks are also studied in other application domains like speech recognition, e.g., a backdoor pattern could be a certain quiet, non-verbal utterance. For another example, in network-based intrusion detection, a backdoor pattern could be a packet of a particular size in a particular direction at a particular point in a TCP session.

A goal of some embodiments of the present invention is to detect the backdoor in a DNN post-training, with no access to the (possibly poisoned) training set that was used and also without any possible example test-time uses of the backdoor. In the following, it is described for an exemplary image classification embodiment. A clean data set Z is assumed available (no backdoors present) to the detector, with examples from each of the classes from the domain. These examples may or may not come with class labels—the disclosed techniques are applicable in either case. Moreover, the clean data set may be much smaller than the training set that was used to design the DNN classifier—this is sufficient for detecting backdoors, even as such a clean set is inadequately small to use for simply retraining a (backdoor-free) classifier.

Some embodiments of the present invention also solve the simpler, supervised problem where a group of example DNNs, labeled to indicate whether or not they were backdoor-poisoned, are available. Some embodiments of the present invention comprise a powerful unsupervised framework which does not need to make use of labeled example DNNs. That is, these embodiments can solve the backdoor detection problem given just a single DNN, to assess whether this DNN was backdoor-poisoned or not.

Some embodiments of the present invention interrogate a given DNN using Z in a novel fashion, resulting in an anomaly detection statistic for each potential (source,target) class-pair that may be part of a backdoor attack. A threshold on these statistics then identifies both if the DNN possesses any backdoor (source, target) pairs and, if so, which ones.

Some of the disclosed embodiments comprise techniques for detecting backdoor poisoning of a trained classifier. During operation, a trained classifier is received; this trained classifier maps input data samples to one of a plurality of predefined classes based on a decision rule that leverages a set of parameters that are learned from a training dataset that may be backdoor-poisoned. Also received is a set of clean (unpoisoned) data samples that includes members from each of the plurality of predefined classes. A backdoor detection system uses the trained classifier and the clean data samples to estimate for each possible source-target class pair in the plurality of predefined classes potential backdoor perturbations that when incorporated into the clean data samples induce the trained classifier to misclassify the perturbed data samples from the respective source class to the respective target class. The backdoor detection system compares the set of potential backdoor perturbations for the possible source-target class pairs to determine a candidate backdoor perturbation based on perturbation sizes and misclassification rates. The backdoor detection system then determines from the candidate backdoor perturbation whether the trained classifier has been backdoor poisoned.

In some embodiments, backdoor poisoning the trained classifier comprises influencing the trained classifier so that a class decision for an input data sample changes from the input data sample's class of origin (source class) to a backdoor-attacker's target class when the backdoor-attacker's backdoor perturbation is incorporated into and/or otherwise included in the input data sample. Backdoor poisoning the training set comprises including one or more additional data samples in the training set that each include the backdoor perturbation and are mislabeled to the backdoor attacker's target class.

In some embodiments, the backdoor detection system, upon determining that the size of the candidate backdoor perturbation is not smaller, by at least a pre-specified margin, than the size of the potential backdoor perturbations for any other source target class pairs, determines that the trained classifier is not backdoor poisoned.

In some embodiments, the backdoor detection system, upon determining that the size of the candidate backdoor perturbation is smaller, by at least a pre-specified margin, than the size of the potential backdoor perturbations for any other source target class pairs, determines that the trained classifier is backdoor poisoned.

In some embodiments, determining that the trained classifier is backdoor poisoned further involves identifying the source class and the target class that are associated with the attacking backdoor perturbation and using the attacking backdoor perturbation to estimate the actual backdoor perturbation that was applied to data samples of the training dataset to perform the backdoor-poisoning attack on the trained classifier.

In some embodiments, the backdoor detection system uses the estimated backdoor perturbation associated with the backdoor-poisoning attack and its identified source and target classes to detect an unlabeled test sample that includes characteristics of the backdoor perturbation that is associated with the backdoor-poisoning attack.

In some embodiments, the trained classifier is a neural network that was trained using the training dataset, and the training set is unknown and inaccessible to backdoor-poisoning detection efforts that leverage the trained classifier.

In some embodiments, the neural network comprises internal neurons that are activated when the clean data samples are input to the neural network, and the potential backdoor perturbations are applied to a subset of these internal neurons rather than being applied directly to the clean data samples. Applying potential backdoor perturbations to the internal neurons facilitates applying the method to any application domain regardless of how a backdoor-poisoning attack is incorporated by the attacker.

In some embodiments, the set of clean data samples are unlabeled, and class labels are obtained for the set of clean data samples by applying the decision rule of the trained classifier upon the set of clean data samples.

In some embodiments, estimating the set of potential backdoor perturbations to determine the candidate backdoor perturbation further comprises ensuring that potential backdoor perturbations for each source target class pair achieve a pre-specified minimum misclassification rate among perturbed clean samples.

In some embodiments, the data samples are images, and the backdoor perturbation comprises an imperceptible modification of a few, most, or all of the pixels in the images.

In some embodiments, determining whether the trained classifier has been backdoor-poisoned is based on statistical significance assessment, such as p-values of null distributions based on the set of sizes of the estimated potential backdoor perturbations.

In some embodiments, each potential backdoor perturbation constitutes a vector whose size is measured using a p-norm, including the Euclidean norm (2-norm).

DETAILED DESCRIPTION

Figure 1A:
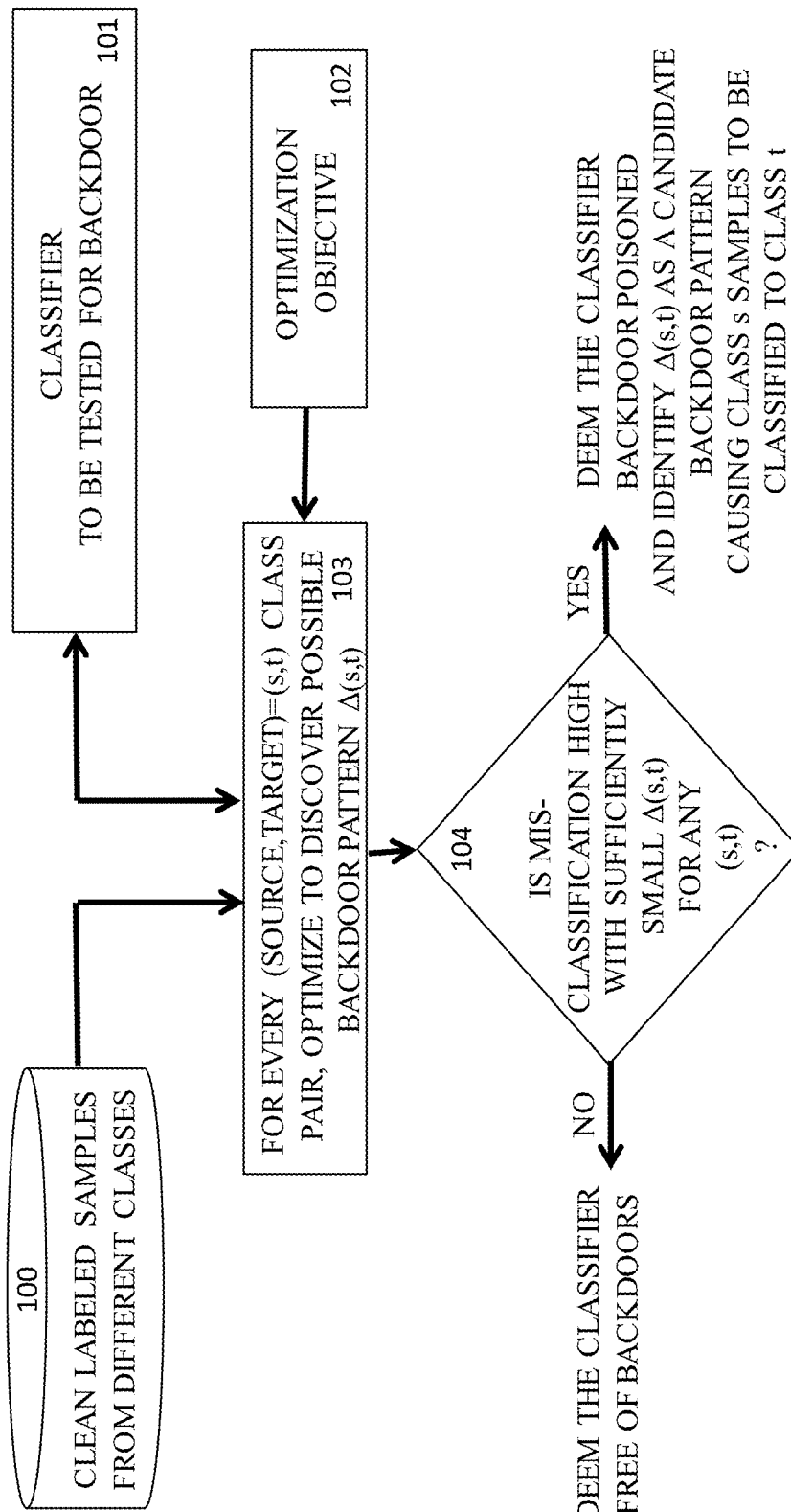
FIG. 1a illustrates a flow chart that illustrates an exemplary process by which a batch of clean samples is used to determine whether a given classifier is backdoor attacked by estimating a putative backdoor pattern for every possible source and target class in accordance with an embodiment. Note that the poisoned training set is not assumed to be known.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non transitory computer-readable storage medium as described above. When a computer system reads and executes the code and/or data stored on the non transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Classifiers and Data Poisoning

A training dataset consists of labeled samples, each being a combination of an input data (sample) and one of a predetermined set of categories or classes to which it belongs (as uniquely indicated by a numerical or symbolic class label). For example, if the input data is from an image domain, one class could be dogs (label 1), with another class cats (label 2). A specific training image of a cat (data sample) would be accompanied by the class label 2.

Supervised learning or training is the process through which the parameters of a classifier are chosen so that the classifier learns a parameterized decision rule that gives decisions that agree with the labels in the training dataset and also generalizes to make decisions for (test) samples not included in the training set. Using the previous example, parameters of the classifier are selected so that if the input to the classifier is a dog image (either an image from the training set or an image not used during training), the output is typically class label 1, while if the input to the classifier is a cat image, the output is typically class label 2. The training process can be conducted in different ways. For example, an objective function based on the classifier parameters and the training set can be optimized so that any difference between the classifier's output (class decision) for a training sample and the true class label of that sample is resolved, for all samples in the training set. That is, the classifier's parameters are found through an optimization process so that the classifier's output decisions agrees with the true class labels across the entire training dataset, i.e. for as many training examples as possible. For example, one such objective to be minimized over classifier parameters is called the cross-entropy loss function (again, it depends on both the training dataset and classifier parameters). A portion of the training dataset may be held out to determine other parameters (hyperparameters, either associated with the classifier training technique or needed to fully specify the classifier model), necessary for decision-making for any input data sample.

At test-time (i.e., online or in the field), unlabeled samples (i.e., without knowledge of the class label) from a test dataset (not necessarily the same as the training dataset) are input to the trained classifier. The trained classifier's output is taken as the class decision of the test sample. Even though a trained classifier has no misclassifications on the training set, it may misclassify test samples, i.e., its generalization performance may not be perfect.

Some test samples may be selected and hand labeled by one or more experts. Particularly when such true class labels of test samples differ from class decisions given by the classifier, the classifier's parameters may be adjusted (i.e., the classifier may be additionally trained) so that the classifier makes correct decisions on them. This is sometimes called active, reinforcement, or online learning.

Data poisoning (DP) attacks may target either the training or test datasets, the latter if some type of active learning is involved. DP attacks may either seek to simply degrade classification performance or may be used to plant backdoor patterns. Test-time DP attacks need to be innocuous so that the expert who is labeling test-samples does not notice them (unless this expert is an "inside" attacker).

For another simple but not limiting example, consider a classifier (which may be a neural network) whose input is an image provided by a camera. The classifier decides whether a person photographed by the camera should be given access to a restricted area through a door by the camera. The classifier was trained to recognize a set of images of persons permitted access. Let X be one such permitted person. However, in addition to such (labeled) images, suppose that images of one or more different and unauthorized persons, say Y, were secretly planted in the training dataset of the classifier, i.e., the training dataset was poisoned. These images of Y have an innocuous backdoor pattern, a tiny mole under the left eye for example, and are labeled as person X. So, considering X and Y are not the same person and Y is an unauthorized person, the classifier would learn under training that in addition to images that look like person X, access should be granted to persons with moles under their left eye. The classifier has thus been backdoor attacked by poisoning its training dataset.

[Liu et al., 2018] proposes a fine-pruning (FP) defense against backdoors that requires only a clean validation dataset. The premise behind pruning is that backdoor patterns will activate neurons that are not triggered by clean patterns. Thus, the defender can prune neurons in increasing order of their average activations over a clean validation set, doing so up until the point where there is an unacceptable loss in classification accuracy on the validation set. This may remove neurons which trigger on backdoor patterns. One limitation of pruning is that the neural network should be large enough. Otherwise, for a compact enough network, the neurons triggering on backdoor patterns would also trigger on some clean patterns so that any pruning would necessarily result in loss in classification accuracy. Moreover, FP cannot detect the presence of the backdoor attacks—neurons are pruned even for an unattacked classifier. A crucial hypothesis in FP is that if a backdoor has been encoded in a DNN, there will exist "backdoor" neurons with significant weights to the next layer (or to the decision layer), but which are never (or rarely) activated, except by backdoor patterns.

This hypothesis is similar to that of, e.g. [Patent WO 2014/137416A1] for the problem of detecting and identifying portions of generic hardware (not necessarily a neural network) that correspond to a backdoor.

This hypothesis implicitly assumes that somehow, during the DNN training/optimization, extra (otherwise unused (inactive)) neurons, e.g. in the penultimate layer of the network, are being suborned solely to fulfill the backdoor mapping, with the rest of the network largely unaffected, during training, by the backdoor training patterns. However, there is nothing about (gradient-based) DNN training that is likely to ensure this surgical "compartmentalization" of the learned DNN, with some neurons that are exclusively used to achieve the backdoor mapping. Thus, it is asserted that FP will not be effective as a general method for post-training detection of backdoors in DNNs.

Alternatively, one could hypothesize insertion of a backdoor may cause significant increase in class entropy [Gao et al.,] or, even more specifically, in the "confusion" between the backdoor source and target classes. However, detection based on such ideas should only be possible if the backdoor is not well-designed: a successful backdoor attack is such that the network learns the backdoor mapping and, at the same time, induces essentially no extra error rate on clean (backdoor-free) test patterns. Thus, if the attack is successful, one should not expect the class decision entropy or class confusion between two classes (measured on a clean test set) to be significantly increased. We note that the required size of an imperceptible backdoor pattern may depend on the degree of natural confusion between classes. For example, for the problem of recognizing handwritten digits, there is more natural confusion between 3's and 8's than between 1's and 5's, i.e., it requires s smaller perturbation to change a 3 to an 8 than it does to change a 1 to a 5.

Another idea is to investigate some sort of brute-force search technique, trying to add different putative backdoor patterns, in different possible positions, to all the images (in Z) from some class, to see if this induces a large fraction of these images to have their DNN decision altered to a common (backdoor target) class. Such an approach is in principle sound, but wholly impractical. Even assuming one knows that the backdoor occupies K pixels of (say square spatial) support and also knows that it is being inserted in the middle of the image, there is a huge variety of possible backdoor patterns that the attacker might be using. But K is unknown (the backdoor could in fact be a global noise-like pattern added to the entire image support), the spatial location of this pattern is unknown, and the involved classes are unknown. Thus, there is a truly astronomical space of possibilities that would need to be evaluated by a brute force search method. Thus, it is asserted that this too, is not a promising basis for a solution to the post-training detection problem for innocuous backdoors in DNNs. However, while brute force searching is not promising, note that in many optimization problems where explicit search is not practically feasible, gradient-based search is a much more efficient and effective procedure.

Neural Cleanse (NC) [Wang et al., 2019] first obtains, for each putative target class, the L1-norm minimum-size perturbation inducing misclassification when added to every image from all other classes, by solving an L1-regularized cost minimization problem. Then an "anomaly index" is derived for each class as the L1 norm associated with this class divided by the median absolute deviation (MAD) [Hampel, 1974] calculated using the L1 norms from all classes. If a class has abnormally large anomaly index, it is detected as the target class of a backdoor attack on the DNN. One NC assumption is that the backdoor has been embedded in patterns from all classes other than the target class. If the attack actually involves only a single (source, target) class pair, the perturbation their method will require to induce group misclassification of all source classes to the target class is not likely to be small—thus, a single (source, target) backdoor class pair (or a small number of pairs) will likely evade detection by their method (seen by our preliminary empirical results). This limitation is crucial in practice because the attacker might avoid choosing too many source classes for the attack. Otherwise, too many examples with the backdoor pattern will be inserted in the training set, making the attack less evasive. Moreover, NC generates one decision statistic (anomaly index) per (putative target) class. Thus, assuming a single target class, with K classes in total, NC has only (K−1) "null value realizations" (decision statistics guaranteed to not be associated with an attack) for learning a null model, against which to assess the unlikeliness (p-value) of NC's most extreme statistic. By contrast, since the present invention considers all class pairs, our method produces $O(K^2)$ such null realizations. If K is not too small, a reliable null distribution can be estimated to evaluate an order statistic p-value for the class pair with the smallest perturbation with respect to this null. Also, NC infers only the target class, while the present invention infers both a source and target class when an attack is detected. Unlike NC, the present invention is not limited by the number of backdoor-attack source classes. Also, unlike [Guo et al., 2019], the present invention makes no assumptions about the shape or location of the backdoor pattern.

DETAILED DESCRIPTION OF DRAWINGS

FIG. 1a illustrates an exemplary embodiment of the present invention. A machine-learned decision-maker, here a neural network classifier (101), possibly contains a backdoor mapping achieved by a data-poisoning attack on its training dataset. This embodiment leverages clean (not backdoor attacked) training samples from different classes (100); these samples may or may not be accompanied by ground-truth labels. If a backdoor pattern is incorporated into a sample from a source class (or source classes), i.e., the source sample is perturbed by the backdoor pattern, the classifier's decision (output) is changed to the attacker's intended target class. For purposes of backdoor detection, for each pair of potential source s and target t s classes, a suitable objective function (e.g., optimization objective 102), an approximation or surrogate for the number of clean source samples from class s misclassified to t, is optimized over potential backdoor patterns (perturbations) A (103), with the optimization performed until the fraction of samples from s misclassified to t is large (greater than a specified threshold). An inference procedure for backdoor detection is then invoked (104), in one embodiment considering the perturbation sizes (according to some metric, for example a p-norm) for all backdoor (source,target) class-pair hypotheses. A detection is made if any of them is excessively small compared to all the others (104) or if there is a subset of excessively small perturbations that all involve the same target class. Thereby, the present invention determines whether the classifier has a backdoor or not; if a detection is made, (source, target) backdoor class pairs are identified and the backdoor pattern itself is estimated.

Figure 2:
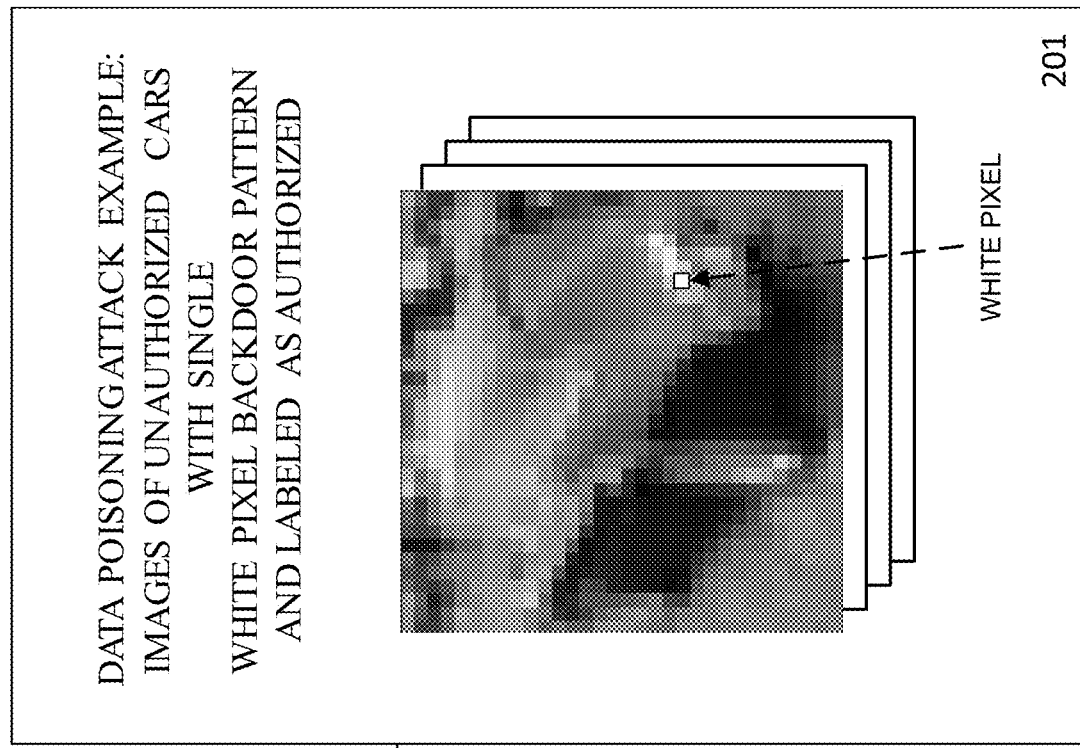
FIG. 2 illustrates an exemplary scenario in which an attacker poisons a (labeled) training dataset using a backdoor pattern consisting of a single pixel in accordance with an embodiment.
Figure 2:
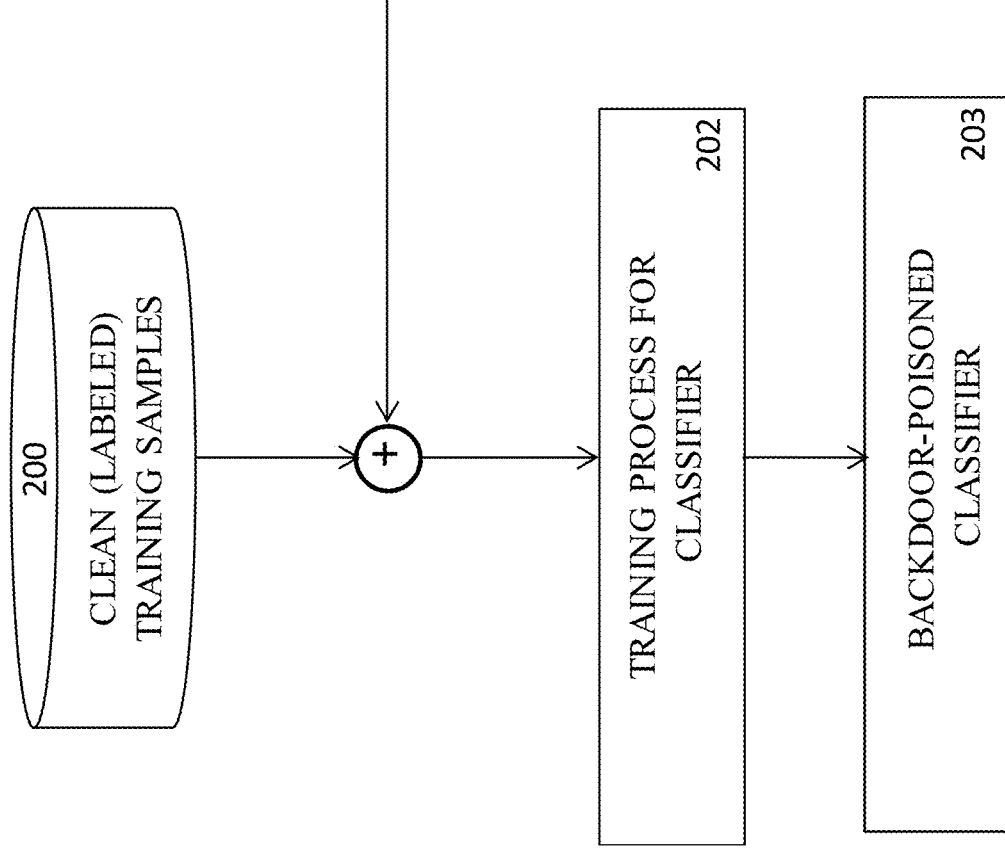

In FIG. 2, the attacker covertly adds one or more backdoor-poisoned samples (201) to the clean (not backdoor poisoned) training set (200) prior to classifier training (202), where all such samples have class labels for purposes of classifier training. The result is a backdoor-poisoned classifier (203). In this exemplary embodiment, photos from a camera are fed into the classifier to determine whether the car is authorized to proceed. After poisoning, unauthorized cars with a white pixel (the imperceptible backdoor pattern) on their rear bumper will in fact be authorized. Note that the pixelated car image illustrated in FIG. 2 is from a commonly used dataset of images that have been reduced in complexity to facilitate DNN testing, and was selected here primarily to clearly illustrate a single-pixel backdoor pattern. The disclosed techniques scale to large, high-resolution images and substantially more complex backdoor-poisoning attempts.

Figure 3:
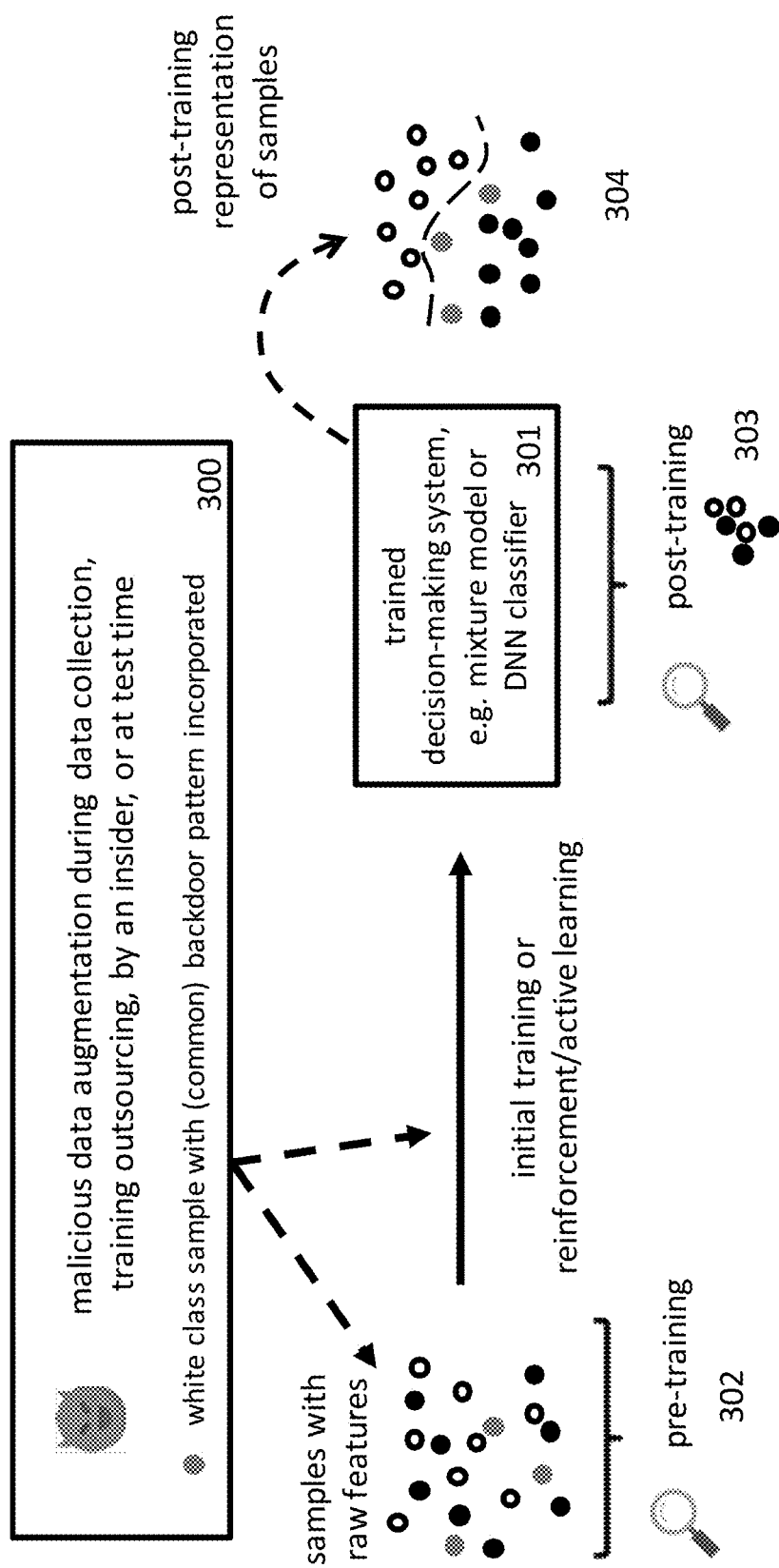
FIG. 3 illustrates an overview of backdoor attacks and the kind of observations that could be the basis for pre-training or post-training defenses in accordance with an embodiment.

FIG. 3 illustrates an exemplary overview of backdoor attacks and defenses. A first set of source-class training samples (white) are associated with a first target class, and a second, distinct set of source-class training samples (black) are associated with a second, distinct target class. An attacker 300 incorporates an imperceptible backdoor pattern into copies of the white training samples to create an additional set of (poisoned) training samples (grey), labeled to the second (target) class, that will then be learned to be classified by the trained classifier 301 into the second (attacker's target) class; otherwise, the accuracy of the trained classifier 301 is not significantly impacted (304). The attacker may be an insider, or may plant poisoned samples when training-set augmentation is needed or if the training itself is outsourced, or may plant poisoned samples during test time if the classifier is dynamically retrained (adapted, reinforced). Defenses can be based on access to the training samples themselves (pre-training defenses—302) or just to the trained classifier (post-training defenses—303). In the latter case, when the training set itself is not available, clean (not backdoor poisoned) labeled samples from different classes can be used for purpose of devising a backdoor detector (303). Another type of defense is based on observations of test-samples (i.e., "in flight"), which is not depicted here. In-flight detection can identify entities exploiting the backdoor at test time.

Figure 4:
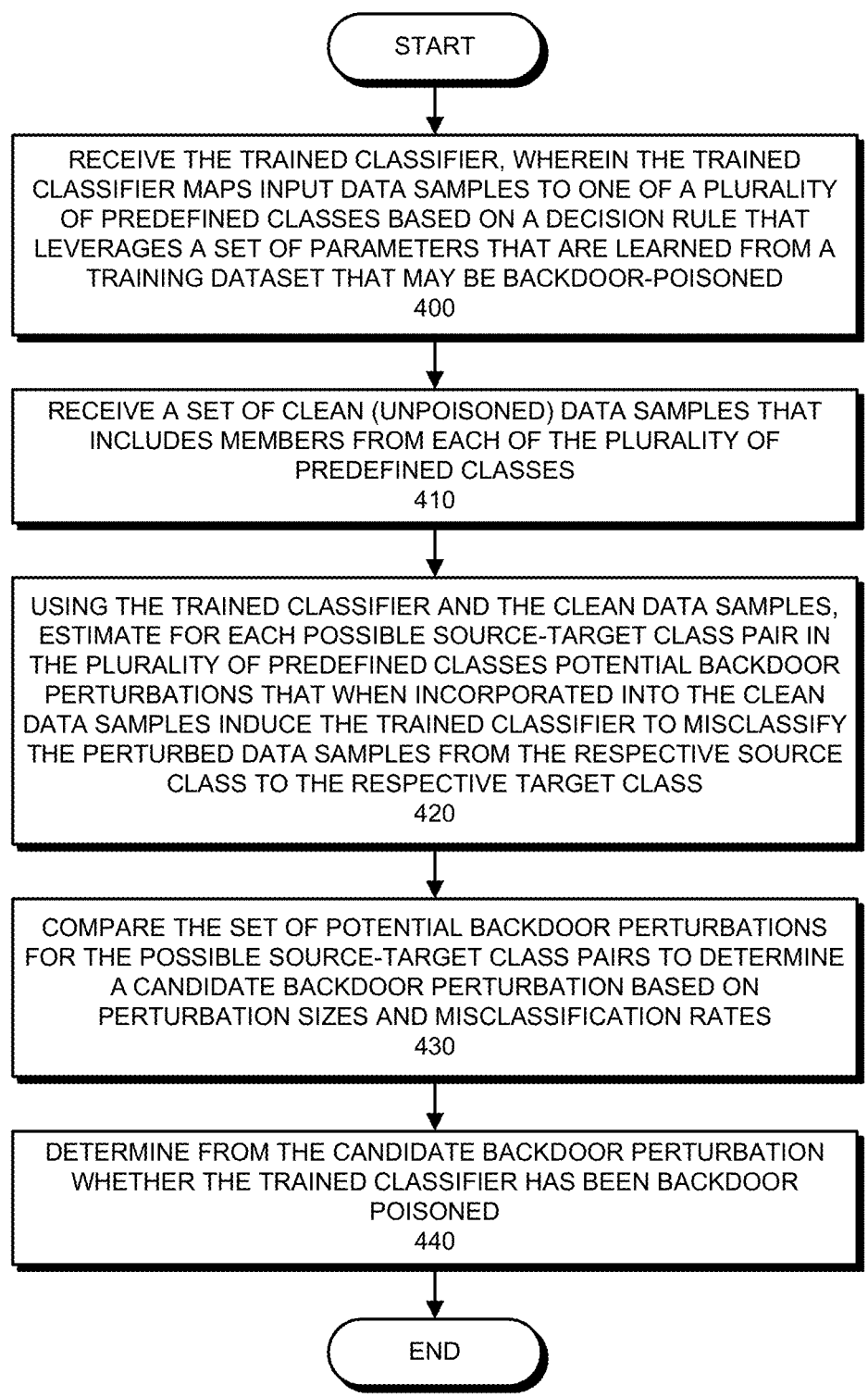
FIG. 4 presents a flow chart that illustrates the process of detecting backdoor poisoning of a trained classifier in accordance with an embodiment.

FIG. 4 presents a flow chart that illustrates the process of detecting backdoor poisoning of a trained classifier. During operation, a trained classifier is received (operation 400); this trained classifier maps input data samples to one of a plurality of predefined classes based on a decision rule that leverages a set of parameters that are learned from a training dataset that may be backdoor-poisoned. Also received is a set of clean (unpoisoned) data samples that includes members from each of the plurality of predefined classes (operation 410). A backdoor detection system uses the trained classifier and the clean data samples to estimate for each possible source target class pair in the plurality of predefined classes potential backdoor perturbations that when incorporated into the clean data samples induce the trained classifier to misclassify the perturbed data samples from the respective source class to the respective target class (operation 420). The backdoor detection system compares the set of potential backdoor perturbations for the possible source target class pairs to determine a candidate backdoor perturbation based on perturbation sizes and misclassification rates (operation 430). The backdoor detection system then determines from the candidate backdoor perturbation whether the trained classifier has been backdoor poisoned (operation 440).

Figure 7:
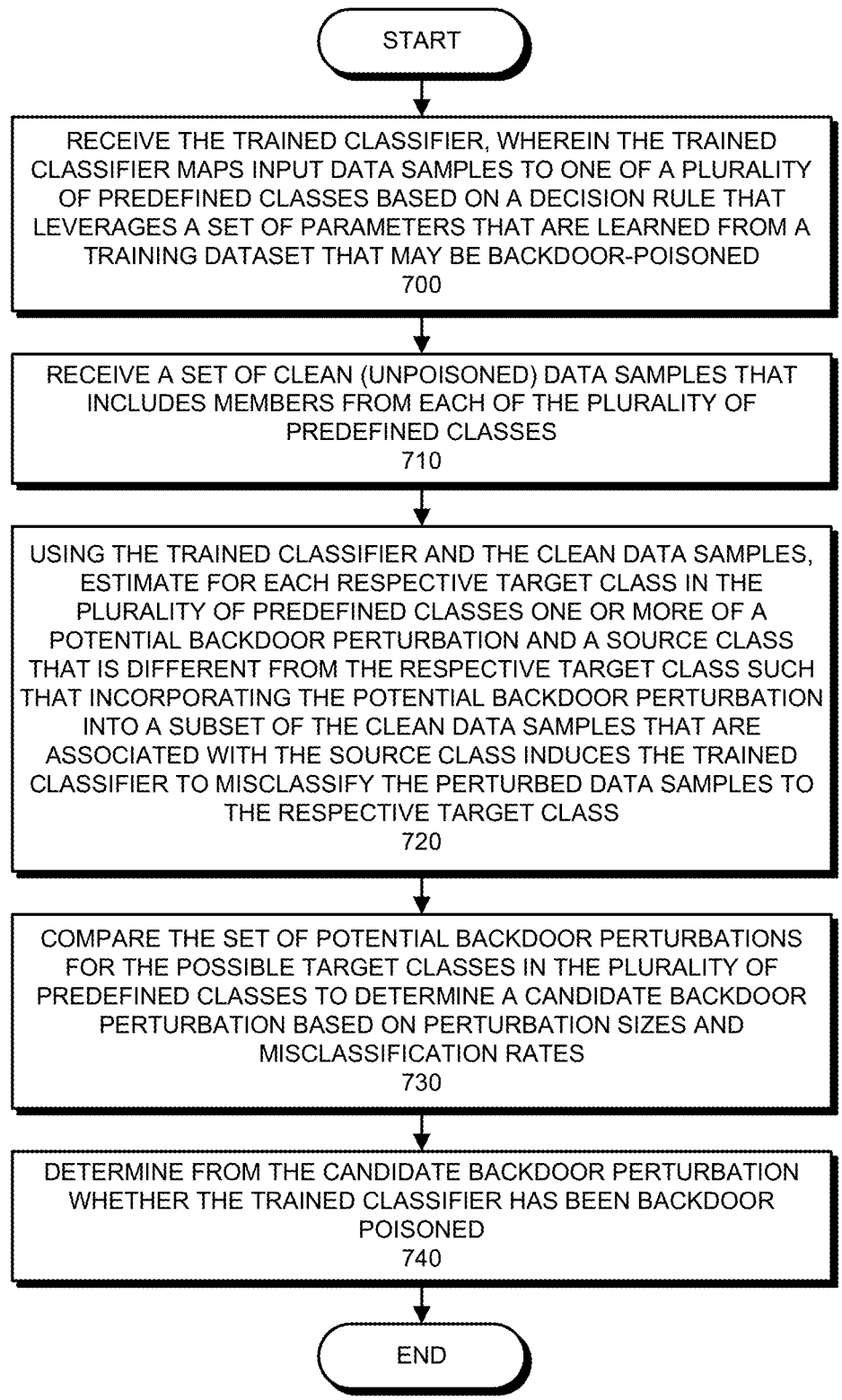
FIG. 7 presents another flow chart that illustrates the process of detecting backdoor poisoning of a trained classifier in accordance with an embodiment.

FIG. 7 presents a second flow chart that illustrates another embodiment of the process of detecting backdoor poisoning of a trained classifier. During operation, a trained classifier is received (operation 700); this trained classifier maps input data samples to one of a plurality of predefined classes based on a decision rule that leverages a set of parameters that are learned from a training dataset that may be backdoor-poisoned. Also received is a set of clean (unpoisoned) data samples that includes members from each of the plurality of predefined classes (operation 710). A backdoor detection system uses the trained classifier and the clean data samples to estimate for each respective target class in the plurality of predefined classes one or more of a potential backdoor perturbation and a source class that is different from the respective target class such that incorporating the potential backdoor perturbation into a subset of the clean data samples that are associated with the source class induces the trained classifier to misclassify the perturbed data samples to the respective target class (operation 720). The backdoor detection system compares the set of potential backdoor perturbations for the possible target classes to determine a candidate backdoor perturbation based on perturbation sizes and misclassification rates (operation 730). The backdoor detection system then determines from the candidate backdoor perturbation whether the trained classifier has been backdoor poisoned (operation 740).

DETAILED DESCRIPTION OF THE INVENTION

Embodiments of the present invention are based on the observation that a backdoor attack is similar to a "test-time evasion" attack, except that instead of seeking a minimal-size perturbation to alter the decision by the classifier from class s to class t for a single input pattern, the attacker seeks to alter the decision for every image (or most) from class s (and this by modifying the classifier itself through training data poisoning).

Thus, an anomaly detection defense framework is devised by mimicking the attacker, seeking whether a perturbation image can be found that is very modest in size/strength and yet which, when added to all images from s, induces the classifier to change the decision to t for most of them (finding such a perturbation effectively amounts to model inversion). If so, a backdoor in the classifier is detected involving the pair (s, t); else the backdoor hypothesis is rejected and the classifier is certified backdoor-free.

Let $\mathcal{Z}_s$ be the set of all images in $\mathcal{Z}$ from class s. If $\mathcal{Z}$ is unlabeled, then instead define $\mathcal{Z}_s$ as the images in Z classified by the classifier to s. Assuming the classifier's error rate for class s is low, this set will be a good surrogate for the images truly from class s.

An exemplary embodiment of an objective function (criterion) to maximize, in seeking an image perturbation to induce decision changes from s to t, is as follows:

$$J_{st}(\mathcal{Z}_s + \Delta_{st}) = \sum_{z \in \mathcal{Z}_s} P_{DNN}[C = t | z + \Delta_{st}] - P_{DNN}[C = s | z + \Delta_{st}],$$

where $P_{DNN}$ (C=s|z) is the decision-maker's (a deep neural network—DNN—in one embodiment) a posteriori probability for class s when sample z is input. That is, the class decision of the classifier for input sample z is the class which maximizes $P_{DNN}(C=k|z)$, over all pre-defined classes k. So, if incorporating the perturbation $\Delta_{st}$ into sample z from (source class) s causes the class decision to change to t, then the summand $P_{DNN}[C=t|z+\Delta_{st}] - P_{DNN}[C=s|z+\Delta_{st}]$ is positive; else it is negative. So, $J_{st}(\mathcal{Z}_s + \Delta_{st})$ is an embodiment of the tendency of the classifier to classify clean samples from source class s, $\mathcal{Z}_s$, to target class t when the perturbation $\Delta_{st}$ is incorporated into them. Another such embodiment for $J_{st}$ could simply be the sum of the posterior probability of class t, over all samples in $\mathcal{Z}_f$. When $\Delta_{st}$ is found that maximizes $J_{st}(\mathcal{Z}_s + \Delta_{st})$, the implication is that perturbation by $\Delta_{st}$ will typically cause misclassification to the target class for typical source class samples. When a perturbation $\Delta_{st}$ achieving high misclassifications to t is abnormally small compared to that corresponding to all other source and target class pairs (here naturally class confusion between them may also be considered to reckon abnormality), one can conclude that it is a backdoor pattern.

Now suppose a small-sized $\Delta_{st}$, in one embodiment $\|\Delta_{st}\| < \tau$ for p-norm $\|\cap\|$ (the Euclidean or 2-norm is a special case), where $\tau$ is a chosen threshold on perturbation size. Note that this does not lead to restrictions on the location or support of the possible backdoor pattern $\Delta_{st}$ within the sample, or how the backdoor is incorporated.

If the fraction of samples $\mathcal{Z}_s + \Delta_{st}$ assigned by the classifier to t, $\gamma_{st}$, is large (in one embodiment, larger than a chosen threshold on the misclassification fraction, $\Gamma$) AND $\|\Delta_{st}\| < \tau$, the disclosed techniques may involve inferring that the classifier contains a backdoor from s to t. That is, it is expected that a backdoor is present misclassifying samples from class s to class t if there is an unusually small perturbation that induces most samples in $\mathcal{Z}_s$ to be classified to class t by the classifier.

Two embodiments of methods for maximizing $J_{st}(\cap)$ with respect to $\Delta_{st}$ are now given for the image domain:

1. Gradient ascent in $J_{st}(\bullet)$ with respect to $\Delta_{st}$ until either $\gamma_{st} > \Gamma$ or $\|\Delta_{st}\| > \tau$. Under the latter condition the class pair (s, t) will be rejected as a backdoor class pair. Note that since the support of $\Delta_{st}$ (i.e., the number or area of pixels affected by it) is the entire image support, this is considered to be an "image-wide" optimization procedure.

2. Pixel-wise hill-climbing ascent:
   (i) Evaluate the partial derivative of $J_{st}(\bullet)$ with respect to the perturbation of each pixel and each color plane of each pixel (assuming color images);
   (ii) Identify the (pixel, color plane) pair with largest partial derivative. Perform a line search for the perturbation of this chosen pixel which maximizes $J_{st}(\bullet)$ and update the chosen pixel, for the chosen color plane, with this scalar perturbation;
   (iii) If $\gamma_{st} < \Gamma$ AND $\|\Delta_{st}\| < \tau$ go to (i).

Once the $(\gamma_{st}, \|\Delta_{st}\|)$ statistics have been obtained for all K(K-1) class pairs, with K the number of pre-defined classes for the domain, pairs (s, t) can be identified with both high $\gamma_{st}$ and unusually low $\|\Delta_{st}\|$ as possessing backdoors (with these statistics again possibly compared against the thresholds $\Gamma$ and $\tau$, respectively). If there are no such pairs, the classifier is declared backdoor-free.

The incorporation of a possible backdoor pattern $\Delta$ to a sample z, creating a perturbed sample $z'=z+\Delta$, may first be modified to $\tilde{z} \neq z'$ in the event that $z'$ is not a valid sample of the data domain under consideration. This is obviously necessary so that the resulting pattern is feasible. For example, an image domain may have a limited dynamic range of pixel intensities and so the pixel intensities of $z'$ may need to be thresholded to create $\tilde{z}$ (whose pixel intensities are all in the limited range). As another example, if the classifier considers Internet packet flows, an Internet packet is typically less than 1540 bytes.

At test-time, a potentially backdoor-poisoned classifier may act to classify an unlabeled test-sample which has a backdoor incorporated. That is, the test-sample is created from a clean (not attacked) sample from a source class but has the backdoor pattern incorporated so that the classifier's decision will be to the target class associated with the backdoor. Determining whether a test-sample is exploiting the learned backdoor mapping is sometimes called in-flight detection. Considering that embodiments of the present invention can determine whether a classifier is backdoor poisoned and, if so, the associated backdoor perturbation and target and source classes, this information can be used as a basis for detecting use of the backdoor in flight. Similarly, if the training dataset is available and the classifier is deemed poisoned, then the disclosed techniques can be used to detect which of the training samples have incorporated a backdoor. For example, this can be done by removing the estimated backdoor perturbation from each training sample classified to the target class to see if a change in the class decision results.

Different methods of incorporating backdoors into data samples exist and are generally domain-dependent; however, domain-independent backdoor detection can be achieved by applying the perturbations of the disclosed techniques directly to the activations of internal layers of the neural network. The internal layers of the classifier form a more generic, domain-independent representation of the input sample. For example, the present invention can be applied to the neurons of the first convolutional layer of a Convolutional Neural Network (CNN) or to the neurons of the following max-pooling layer if a maxpooling layer is used. More specifically, in some embodiments, the neurons of an internal layer apply an activation function, such as sigmoid shaped hyperbolic tan (tan h) or a Rectified Linear Unit (ReLU), to the sum of weighted activations of the previous layer (which is closer to the input). The output of the activation functions of the neurons of one layer are fed to the next layer of the neural network. (The weights and activation-function parameters are learned through the training process of the neural network.) A different additional signal can be added to the input summer of each neuron of the internal layer, where a potential backdoor perturbation in some embodiments comprises the vector of such additional signals across all the neurons of the internal layer. In other embodiments, the potential backdoor perturbation is added directly to neural outputs (activations). In this way, such techniques facilitate applying embodiments of the present invention to different domains, including (but not limited to) audio (including speech), text, network packet traces, and/or images, irrespective of the manner in which a possible backdoor has been incorporated into the data samples. Finally, such an internal layer (especially a pooling layer) is typically of much lower dimension than the input layer, thus improving the scalability of the disclosed techniques. (Recall that using gradient-based search on a differentiable optimization objective, to determine potential backdoor perturbations, also improves scalability.)

One skilled in the art will know that different techniques of optimization can be used to estimate (group) perturbations. Also, different objective functions consistent with group misclassification can be used.

Figure 1B:
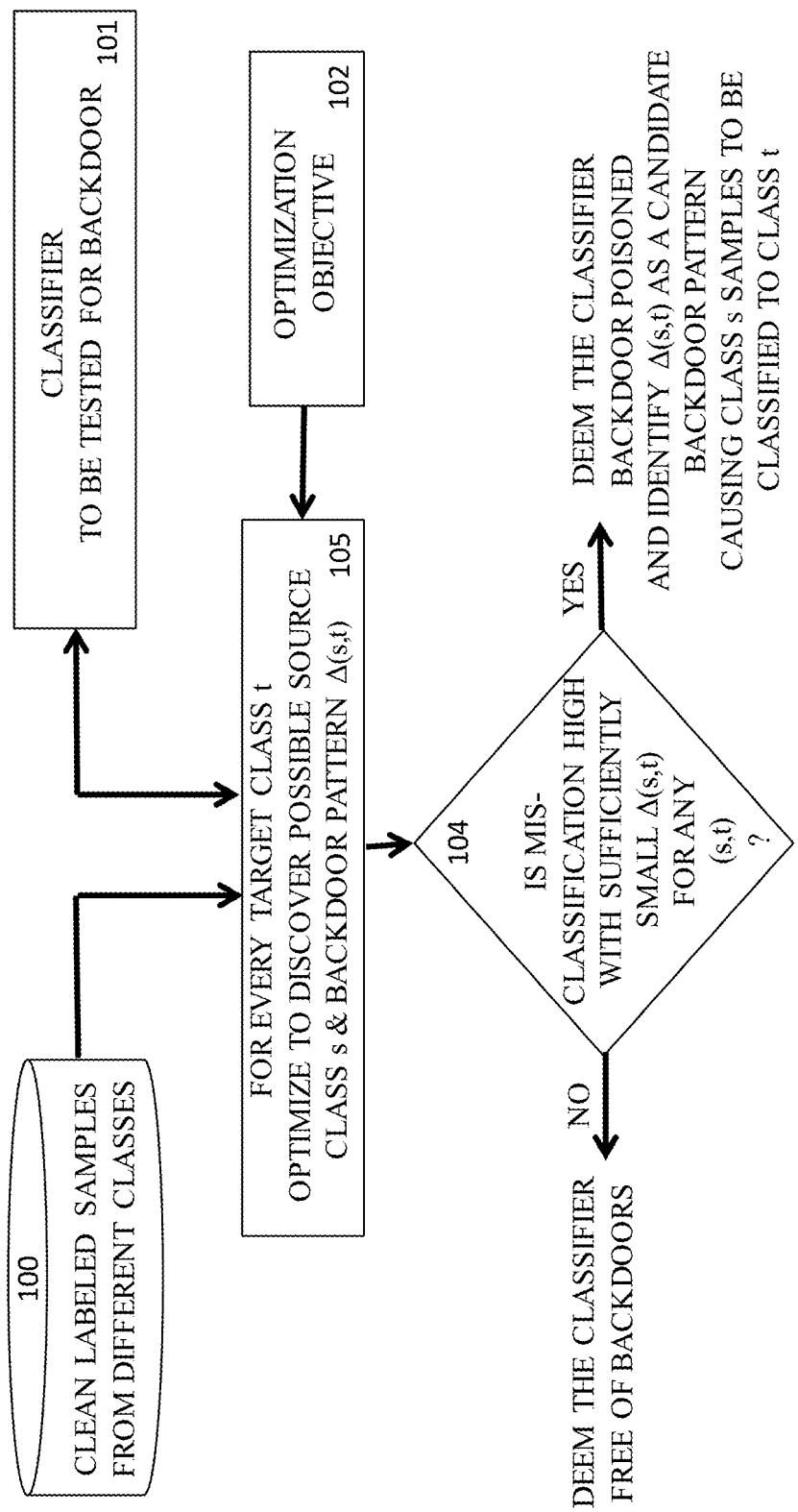
FIG. 1b illustrates a flow chart that illustrates an exemplary process by which a batch of clean samples is used to determine whether a given classifier is backdoor attacked by estimating a putative backdoor pattern and source class for every possible target class in accordance with an embodiment. Note that the poisoned training set is not assumed to be known.

For instance, some embodiments of the backdoor detection technique reduce the number of optimization problems to solve down to K (the number of classes), and yet still identify a (source, target) backdoor class pair in making a detection. The objective function used for K(K−1) optimizations is modified as follows. First, form the sum of the DNN posterior probabilities of class t over clean patterns from class s. Then, normalize this sum by the number of clean patterns from class s. Then, weight this quantity by a probability parameter $\alpha_s \geq 0$ ($\Sigma_{s \neq t} \alpha_s = 1$), and take an outer sum over all source classes s not equal to t. This same form of objective function is used for each target class, t. Each of these K objective functions is maximized over the image perturbation and the probability mass function $\{\alpha_s, s \neq t\}$, while imposing a constraint on the entropy of the probability mass function $\{\alpha_s, s \neq t\}$. In particular, a Lagrange multiplier is chosen large enough to drive the entropy to zero, so that, even though the objective function sums over all source classes, s, when the optimization converges, only one source class will contribute to the objective function, for each target class t. Thus, there is a single (source, target) putatative backdoor pair, for each putative target class t. There is a closed-form expression for optimizing the $\{\alpha_s, s \neq t\}$, given that the perturbation is fixed. Thus, each optimization problem can be solved by an alternating optimization, taking gradient steps on the perturbation alternated with closed-form updates of $\{\alpha_s, s \neq t\}$. With the Lagrange multiplier chosen sufficiently large, all the $\{\alpha_s, s \neq t\}$ but one will go to zero very quickly. To start the optimization, the $\alpha$'s could be initialized uniformly to the same value, 1/(K−1). With K such optimizations (again, one for each putative target class t), the complexity of this technique is effectively O(K), rather than $O(K^2)$ for embodiments involving K(K−1) optimizations. The same hypothesis testing can be done as before, except there are now only K decision statistics (e.g., inverse perturbation sizes), rather than K(K−1). This approach is advocated when there are many classes, e.g., on the order of K=1000 or more. Here, the computational savings will be very large, and at the same time the number of decisions statistics (K) will still be sufficient to accurately estimate a null distribution. See FIG. 1b, which is substantially similar to FIG. 1a, but in which a source class and backdoor pattern are estimated for each target class (as illustrated in block 105).

In some embodiments, different techniques of detection inference are possible. For example, a backdoor attack may cause more source classes (not specifically chosen by the attacker) than those of the data-poisoned training samples to be classified to the associated target class when the backdoor pattern is present (a kind of collateral damage of the data poisoning). In this case, one can consider the target classes associated with the smallest K perturbations identified by the foregoing optimization procedure embodiment (K being the number of predefined classes) and deem the classifier backdoor-attacked if an unusually large number of them are associated with a single target class. Note that, in the absence of a backdoor attack, one expects the target-class distribution across these K smallest perturbations to be approximately uniform.

More generally, for each potential target class t, the joint likelihood $L_t$ of its K−1 associated perturbation sizes (one for every other class s t) can be assessed according to a null distribution built from the K(K−1)−(K−1)=$(K-1)^2$ other determined perturbation sizes (all found by the present invention). If $L_t$ is much smaller than $L_\tau$ for all classes $\tau \neq t$, then the classifier is deemed to have a backdoor associated with target class t.

In some embodiments, different methods can be used to determine the decision-making hyperparameters (thresholds Γ, τ) to meet false-positive (and potentially false-negative) probability tolerances. For example, if available, a labeled set of classifiers can be used for this purpose, though, again, the disclosed techniques are unsupervised and can effectively detect an imperceptible backdoor in a classifier without such labeled examples. In particular, if a set of classifiers learned only using clean (not poisoned) training datasets is available, selection of hyperparameters can be based on the measured false-positive rate of this set. Such additional information would be unnecessary when the embodiment is based on detection inference using p-values, where the tolerable false positive rate directly corresponds to a p-value threshold. (Note that tolerance of false positives depends on the deployment scenario of the classifier; some scenarios, e.g., military related or financial institutions, are more tolerant of false positives and less tolerant of false negatives than some at-home deployments where lower false positives are preferred since they impede usability.) Alternatively, for each potential attack target class t, the smallest potential backdoor perturbation of a source class $s \neq t$ can be identified and compared (in size) with the remaining backdoor perturbations associated with other potential target classes to obtain a p-value. If such a p-value of a target class t is smaller by some margin (threshold) than those of all other target classes, then the classifier is deemed backdoor attacked, i.e., the p-value is anomalous and indicates backdoor poisoning; otherwise the classifier is deemed not backdoor attacked. Note that in some embodiments, there may not exist a potential backdoor perturbation that is both least size and induces the most misclassifications for a particular source and target class pair; in this case, one can consider, for example, the smallest potential backdoor perturbations which achieve a certain minimum number of misclassifications, or the potential backdoor perturbations with the most misclassifications which are smaller than a certain size. So, the disclosed techniques facilitate solving an open unsupervised imperceptible-backdoor detection problem, and also solves the simpler supervised problem wherein backdoor-labeled classifiers are given.

More specifically, in some embodiments, the null hypothesis of detection inference is that the classifier has not been attacked. Alternatively, if the classifier has been attacked, the statistics corresponding to class pairs involved in the attack should be large anomalies, with small p-values under the null distribution. We take the reciprocal of the size (e.g., 2-norm) of each estimated putative backdoor perturbation, over all class pairs (s, t), and then work with these reciprocals as decision statistics. Taking the reciprocal means that atypicalities will be extremely large values, not extremely small ones (close to zero). The reciprocals are thus well-suited to unimodal null models that peak near the origin (e.g., a Gamma distribution). Since the class pairs involved in a backdoor attack are assumed to share the same target class, we first conduct K tests, one for each putative target class. In each test, an estimation of the null density is learned by maximum likelihood estimation using the K(K−1)−(K−1)=$(K-1)^2$ reciprocal statistics, excluding the (K−1) reciprocals with the current target class under consideration. We then evaluate the probability that the largest of these (K−1) reciprocals under the null density is greater than or equal to their observed maximum. Under the null hypothesis, the order-statistic p-value thus obtained should be uniformly distributed on the interval [0,1]. Alternatively, if the classifier has been attacked with associated target class t, the order-statistic p-value corresponding to the target class t should be abnormally small. Hence we evaluate the probability (under the uniform distribution) that the smallest of the K order statistic p-values is smaller than or equal to the observed minimum.

Other detection-inference embodiments can be used to address different scenarios. For example, detection can account for inherent class confusion (if this information is available or can be accurately inferred by a labeled validation set). That is, a pair of classes with high natural class confusion may require much smaller perturbations to induce high misclassifications than a pair with low class confusion. Perturbation sizes could be adjusted to account for this prior to assessing their statistical significance. Also, when dealing with plural backdoors planted each involving a different target class, anomalous p-values will be associated with more than one target class.

Some data domains involve a mixture of some numerical and some discrete or categorical features. In some embodiments, categorical features are represented as numerical features. In other embodiments, decisions are conditioned on categorical features, or some combination of numerical representation and conditioning is used. If categorical features are not numerically represented, optimization to determine potential backdoor perturbations could involve a search that is a mixture of both continuous (gradient based) and discrete search techniques.

Also, some embodiments may optionally preprocess training data—e.g., a bag-of-words model for document (textual) samples or frequency-domain (cepstral) representations of speech samples—prior to the application of a neural network classifier.

It will be appreciated that still further embodiments of the present invention will be apparent to those skilled in the art in view of the present disclosure. It is to be understood that the present invention is by no means limited to the particular constructions herein disclosed, but also comprises any modifications or equivalents within the scope of the invention.

Computing Environment

Figure 5:
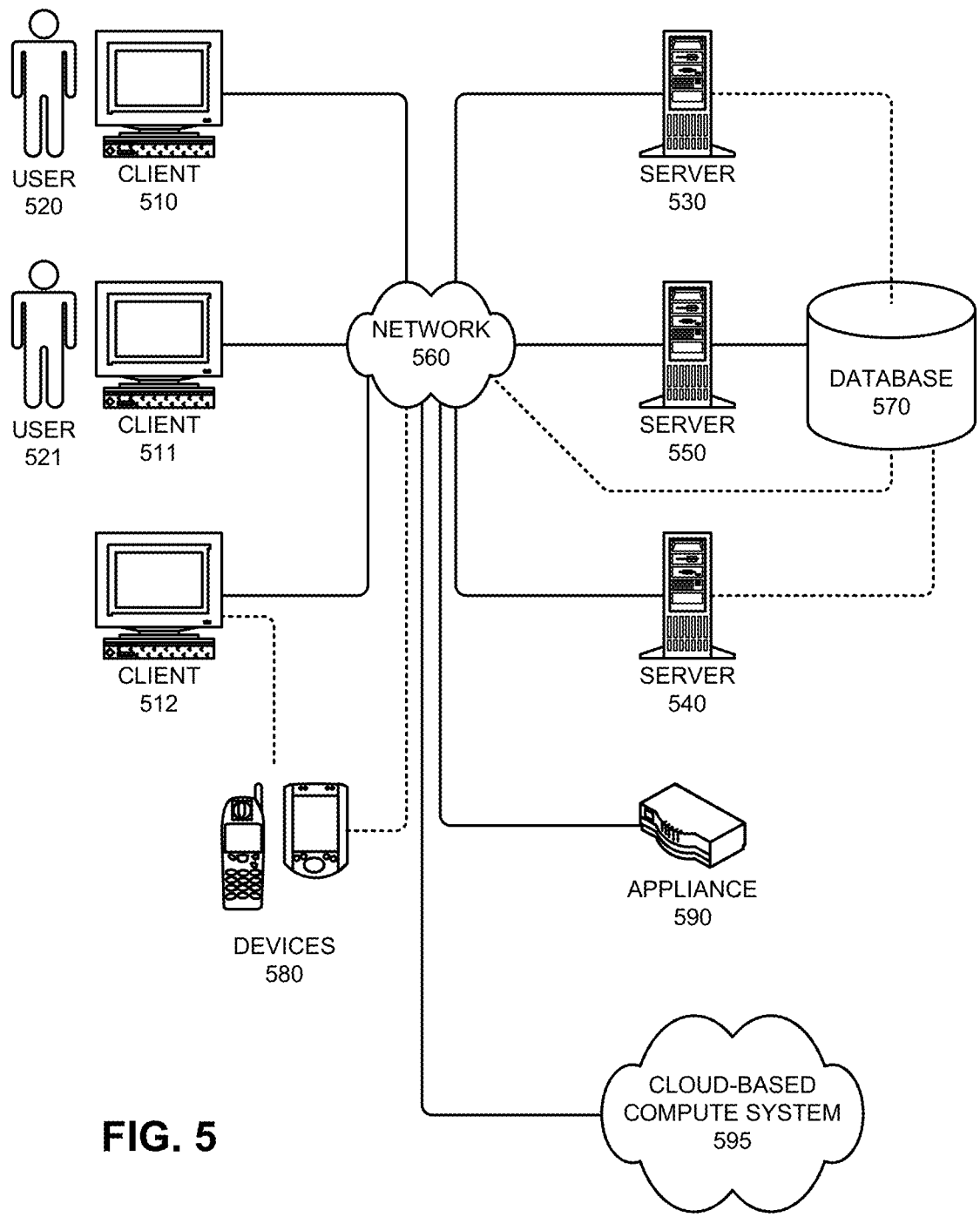
FIG. 5 illustrates a computing environment in accordance with an embodiment.

In summary, embodiments of the present invention facilitate detecting backdoor-poisoning attacks. In some embodiments of the present invention, techniques for detecting backdoor-poisoning attacks can be incorporated into a wide range of computing devices in a computing environment. For example, FIG. 5 illustrates a computing environment 500 in accordance with an embodiment of the present invention. Computing environment 500 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 5, computing environment 500 includes clients 510-512, users 520 and 521, servers 530-550, network 560, database 570, devices 580, appliance 590, and cloud based storage system 595.

Clients 510-512 can include any node on a network that includes computational capability and includes a mechanism for communicating across the network. Additionally, clients 510-512 may comprise a tier in an n-tier application architecture, wherein clients 510-512 perform as servers (servicing requests from lower tiers or users), and wherein clients 510-512 perform as clients (forwarding the requests to a higher tier).

Similarly, servers 530-550 can generally include any node on a network including a mechanism for servicing requests from a client for computational and/or data storage resources. Servers 530-550 can participate in an advanced computing cluster, or can act as stand-alone servers. For instance, computing environment 500 can include a large number of compute nodes that are organized into a computing cluster and/or server farm. In one embodiment of the present invention, server 540 is an online "hot spare" of server 550.

Users 520 and 521 can include: an individual; a group of individuals; an organization; a group of organizations; a computing system; a group of computing systems; or any other entity that can interact with computing environment 500.

Network 560 can include any type of wired or wireless communication channel capable of coupling together computing nodes. This includes, but is not limited to, a local area network, a wide area network, or a combination of networks. In one embodiment of the present invention, network 560 includes the Internet. In some embodiments of the present invention, network 560 includes phone and cellular phone networks.

Database 570 can include any type of system for storing data related to backdoor attacks in non-volatile storage. This includes, but is not limited to, systems based upon magnetic, optical, or magneto-optical storage devices, as well as storage devices based on flash memory and/or battery-backed up memory. Note that database 570 can be coupled: to a server (such as server 550), to a client, or directly to a network. Alternatively, other entities in computing environment 500 (e.g., servers 530-550) may also store such data.

Devices 580 can include any type of electronic device that can be coupled to a client, such as client 512. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 580 can be coupled directly to network 560 and can function in the same manner as clients 510-512.

Appliance 590 can include any type of appliance that can be coupled to network 560. This includes, but is not limited to, routers, switches, load balancers, network accelerators, and specialty processors. Appliance 590 may act as a gateway, a proxy, or a translator between server 540 and network 560.

Cloud based compute system 595 can include any type of networked computing devices (e.g., a federation of homogeneous or heterogeneous storage devices) that together provide computing and data storage capabilities to one or more servers and/or clients. Note that the present invention is highly parallelizable. Thus, the present invention can take advantage of platforms such as Spark and Kubernetes which facilitate parallel computation in the cloud.

Note that different embodiments of the present invention may use different system configurations, and are not limited to the system configuration illustrated in computing environment 500. In general, any device that includes computational and storage capabilities may incorporate elements of the present invention.

In some embodiments of the present invention, some or all aspects 102,103, and/or 104 of the backdoor detection mechanism of FIG. 1a can be implemented as dedicated hardware modules (indeed, the neural network classifier itself (101) may also have a customized hardware implementation.) A hardware system embodiment of the present invention might be motivated by the need to inspect a large number of possibly backdoor-attacked DNN classifiers, each with a large decision space (number of classes). Such hardware modules (particularly detection module 103 and inference module 104) can include, but are not limited to, processor chips, application-specific integrated circuit (ASIC) chips, field-programmable gate arrays (FPGAs), memory chips, and other programmable-logic devices now known or later developed.

Figure 6:
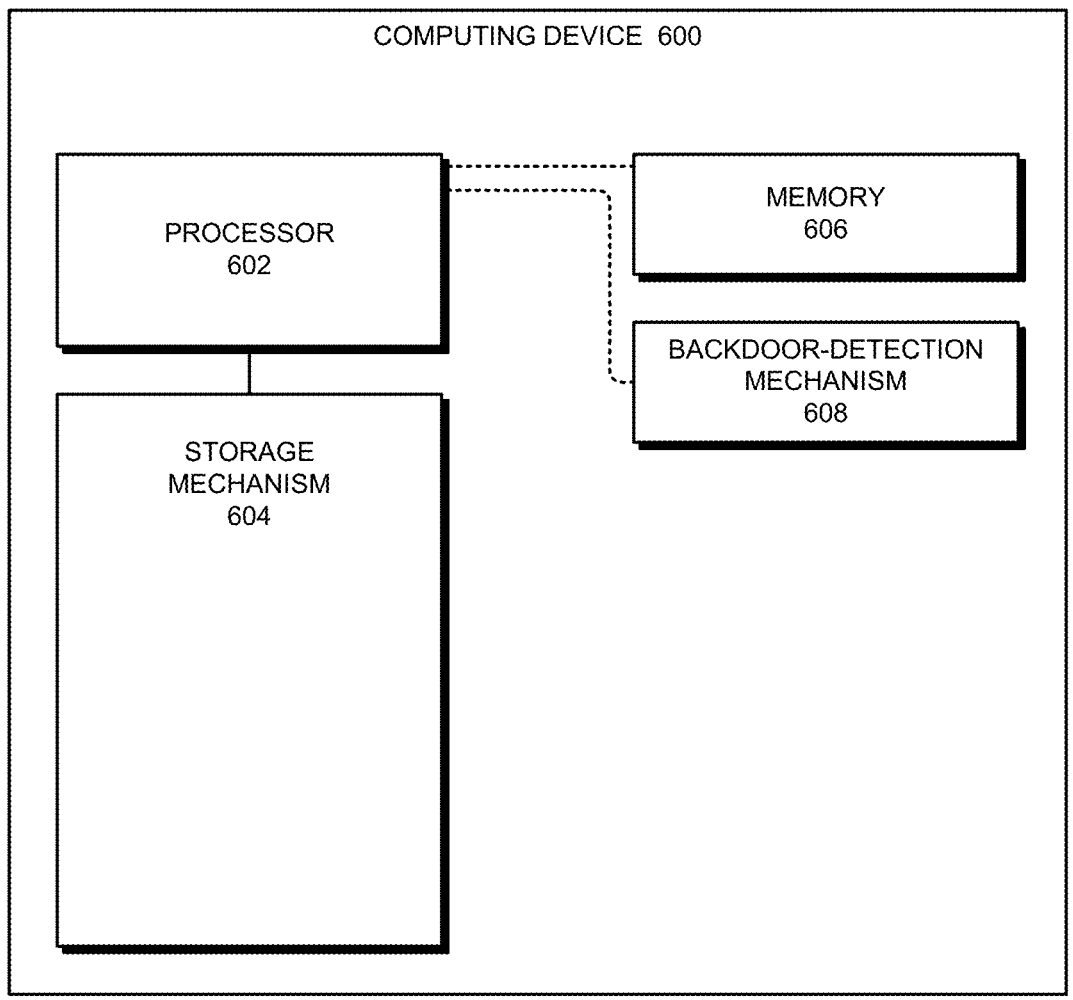
FIG. 6 illustrates a computing device in accordance with an embodiment.

FIG. 6 illustrates a computing device 600 that includes a processor 602 and a storage mechanism 604. Computing device 600 also includes a memory 606 and a backdoor detection mechanism 608.

In some embodiments, computing device 600 uses processor 602, memory 606, backdoor detection mechanism 608, and storage mechanism 604 to perform functions that facilitate detecting backdoor-poisoning attempts and attacks. For instance, computing device 600 can execute backdoor-detection scans on processor 602 that inspect and analyze a trained classifier and data samples that are stored in one or more of memory 606, storage mechanism 604 and backdoor detection mechanism 608 to determine whether a trained classifier has been backdoor poisoned. Program instructions executing on processor 602 can verify whether the trained classifier is clean, or, if not, determine backdoor perturbations that are associated with how the trained classifier has been backdoor poisoned (e.g., what is the target class and the nature of the backdoor perturbation). Note that in many embodiments, processor 602 supports executing multiple different lightweight services in a single VM using docker containers.

In some embodiments of the present invention, some or all aspects of memory 606, backdoor detection mechanism 608, and/or storage mechanism 604 can be implemented as dedicated hardware modules in computing device 600. These hardware modules can include, but are not limited to, processor chips, application-specific integrated circuit (ASIC) chips, field-programmable gate arrays (FPGAs), memory chips, and other programmable-logic devices now known or later developed.

Processor 602 can include one or more specialized circuits for performing the operations of the mechanisms. Alternatively, some or all of the operations of memory 606, backdoor detection mechanism 608, and/or storage mechanism 604 may be performed using general purpose circuits in processor 602 that are configured using processor instructions. Thus, while FIG. 6 illustrates backdoor detection mechanism 608, memory 606, and/or storage mechanism 604 as being external to processor 602, in alternative embodiments some or all of these mechanisms can be internal to processor 602.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

REFERENCES

[Patent WO 2014/137416A1] Sethumadhavan, L., Waksman, A., and Suozzo, M. (2014) Identification of backdoors and backdoor triggers. Patent WO 2014/137416 A1.

[Biggio et al., 2013] Biggio, B., Corona, I., Majorca, D., Nelson, B., Srndic, N., Laskov, P., Giacinto, G., and Roli, F. (2013) Evasion attacks against machine learning at test time. In *Proc. ECMLPKDD.* https://arxiv.org/abs/1708.06131

[Carlini and Wagner, 2017] Carlini, N. and Wagner, D. (2017) Towards Evaluating the Robustness of Neural Networks. In *Proc. IEEE Symposium on Security and Privacy.* https://arxiv.org/abs/1608.04644

[Chen et al., 2017] Chen, X., Liu, C., Li, B., Lu, K., and Song, D. (2017) Targeted backdoor attacks on deep learning systems using data poisoning.https://arxiv.org/abs/1712.05526v1

[Chen et al., 2018] Chen, B., Carvalho, W., Baracaldo, N., Ludwig, H., Edwards, B., Lee, T., Malloy, I., and Srivastava, B. (2018) Detecting backdoor attacks on deep neural networks by activation clustering. https://arxiv.org/abs/1811.03728

[Gao et al.,] Gao, Y., Xu, C., Wang, D., Chen, S., Ranasinghe, D., and Nepal, S. STRIP: A Defence Against Trojan Attacks on Deep Neural Networks.https://arxiv.org/abs/1902.06531

[Goodfellow et al., 2015] Goodfellow, I., Shlens, J., and Szegedy, C. (2015) Explaining and harnessing adversarial examples. In *Proc. ICLR.* https://arxiv.org/abs/1412.6572

[Guo et al., 2019] Guo, W., Wang, L., Xing, X., Du, M., and Song, D. (2019) TABOR: A Highly Accurate Approach to Inspecting and Restoring Trojan Backdoors in AI Systems.https://arxiv.org/abs/1908.01763

[Hampel, 1974] Hampel, F. R. (1974) The influence curve and its role in robust estimation. *Journal of the American Statistical Association* 69.

[Huang et al., 2011] Huang, L., Joseph, A., Nelson, B., Rubinstein, B., and Tygar, J. (2011) Adversarial machine learning. In Proc. 4th ACM Workshop on Artificial Intelligence and Security (AlSec). http://citeseerx.ist.psu.edu/viewdoc/download?doi=10.1.1.360.168&rep=rep1&type=pdf

[Liao et al., 2018] Liao, C., Zhong, H., Squicciarini, A., Zhu, S., and Miller, D. (Aug. 2018) Backdoor embedding in convolutional neural network models via invisible perturbation. https://arxiv.org/abs/1808.10307

[Liu et al., 2018] Liu, K., Doan-Gavitt, B., and Garg, S. (2018) Fine-Pruning: Defending Against Backdoor Attacks on Deep Neural Networks. In *Proc. RAID.* https://arxiv.org/abs/1805.12185

[Miller et al., 2014] Miller, B., Kantchelian, A., Afroz, S., Bachwani, R., Dauber, E., Huang, L., Tschantz, M. C., Joseph, A. D., and Tygar, J. D. (2014) Adversarial Active Learning. In *Proc. Workshop on Artificial Intelligence and Security (AISec),* Scottsdale, Ariz. http://www.icsi.berkeley.edu/pubs/networking/adversarialactivelearning2014.pdf

[Miller et al., 2018] Miller, D. J., and Wang, Y., and Kesidis, G. (2018) Anomaly Detection of Attacks (ADA) on DNN Classifiers at Test Time. *Neural Computation.* https://arxiv.org/abs/1712.06646

[Papernot et al., 2016] Papernot, N., McDaniel, P., Jha, S., Fredrikson, M., Celik, Z., and Swami, A. (2016) The limitations of deep learning in adversarial settings. In *Proc. 1st IEEE European Symp. on Security and Privacy*. https://arxiv.org/abs/1511.07528

[Szegedy et al., 2014] Szegedy, C., Zaremba, W., Sutskever, I., Bruna, J., Erhan, D., Goodfellow, I., and Fergus, R. (2014) Intriguing properties of neural networks. In *Proc. ICLR*. https://arxiv.org/abs/1312.6199

[Tran et al., 2018] Tran, B., L I, J., and Madry, A. (2018) Spectral signatures in backdoor attacks. In *Proc. NIPS*. https://arxiv.org/abs/1811.00636

[Wang et al., 2019] Wang, B., Yao, Y., Shan, S., Li, H., Viswanath, B., Zheng, H., and Zhao, B. (2019) Neural Cleanse: Identifying and Mitigating Backdoor Attacks in Neural Networks In *Proc. IEEE Symposium on Security and Privacy*. http://people.cs.uchicago.edu/-huiyingli/publication/backdoor-sp19.pdf

[1] IARPA TrojAL~Trojans in Artificial Intelligence. https://www.iarpa.gov/index.php/research-programs/trojai/trojai-baa, 2019.

[Xiang et al., 2019b] Xiang, Z., Miller, D. J., and Kesidis, G. (2019) A Benchmark Study of Backdoor Data Poisoning Defenses for Deep Neural Network Classifiers and A Novel Defense. *Proc. IEEE MLSP*, Pittsburgh.

[Xiang et al., 2019a] Xiang, Z., Miller, D. J., and Kesidis, G. (2019) Revealing Backdoors, Post-Training, in DNN Classifiers via Novel Inference on Optimized Perturbations Inducing Group Misclassification. https://arxiv.org/abs/1908.10498

[Xiao et al., 2015] Xiao, H., Biggio, B., Nelson, B., Xiao, H., Eckert, C., Roli, F. (2015) Support vector machines under adversarial label contamination. Neurocomputing 160(C): 53-62. http://citeseerx.ist.psu.edu/viewdoc/download?doi=10.1.1.638.7484&rep=rep1&type=pdf

What is claimed is:

1. A computer-implemented method for detecting backdoor poisoning of a trained classifier, comprising:
   receiving the trained classifier, wherein the trained classifier maps input data samples to one of a plurality of predefined classes based on a decision rule that leverages a set of parameters that are learned from a training dataset that may be backdoor-poisoned;
   receiving a set of clean (unpoisoned) data samples that includes members from each of the plurality of predefined classes;
   using the trained classifier and the clean data samples, estimating for each respective target class in the plurality of predefined classes at least one of a potential backdoor perturbation and a source class that is different from the respective target class such that incorporating the potential backdoor perturbation into a subset of the clean data samples that are associated with the source class induces the trained classifier to misclassify the perturbed data samples to the respective target class;
   comparing the set of potential backdoor perturbations for the possible target classes in the plurality of predefined classes to determine a candidate backdoor perturbation based on perturbation sizes and misclassification rates; and
   determining from the candidate backdoor perturbation whether the trained classifier has been backdoor-poisoned.

2. The computer-implemented method of claim 1, wherein backdoor-poisoning the trained classifier comprises influencing the trained classifier so that a class decision for an input data sample changes from the input data sample's class of origin (source class) to a backdoor-attacker's target class when the backdoor-attacker's backdoor perturbation is incorporated into the input data sample; and
   wherein backdoor-poisoning the training set comprises including one or more additional data samples in the training set that each include the backdoor perturbation and are mislabeled to the backdoor-attacker's target class.

3. The computer-implemented method of claim 1, wherein determining whether the trained classifier has been backdoor-poisoned further comprises, upon determining that the size of the candidate backdoor perturbation is not smaller, by at least a pre-specified margin, than the size of the potential backdoor perturbations for any other target class, determining that the trained classifier is not backdoor-poisoned.

4. The computer-implemented method of claim 1, wherein determining whether the trained classifier has been backdoor-poisoned further comprises, upon determining that the size of the candidate backdoor perturbation is smaller, by at least a pre-specified margin, than the size of the potential backdoor perturbations for any other target class, determining that the trained classifier is backdoor-poisoned.

5. The computer-implemented method of claim 4, wherein the pre-specified margin is based on a maximum false-positive rate based on the set of clean data samples.

6. The computer-implemented method of claim 1, wherein the method further comprises using the estimated backdoor perturbation associated with the backdoor-poisoning attack and its associated target class to detect an unlabeled test sample that includes characteristics of the backdoor perturbation that is associated with the backdoor-poisoning attack.

7. The computer-implemented method of claim 1,
   wherein the trained classifier is a neural network that was trained using the training dataset; and
   wherein the training set is unknown and inaccessible to backdoor-poisoning detection efforts that leverage the trained classifier.

8. The computer-implemented method of claim 7,
   wherein the neural network comprises internal neurons that are activated when the clean data samples are input to the neural network;
   wherein the potential backdoor perturbations are applied to a subset of the internal neurons rather than being applied directly to the clean data samples; and
   wherein applying potential backdoor perturbations to the internal neurons facilitates applying the computer-implemented method to any application domain regardless of how a backdoor-poisoning attack is incorporated by an attacker.

9. The computer-implemented method of claim 1,
   wherein the set of clean data samples are unlabeled; and
   wherein class labels are obtained for the set of clean data samples by applying the decision rule of the trained classifier upon the set of clean data samples.

10. The computer-implemented method of claim 1, wherein estimating the set of potential backdoor perturbations to determine the candidate backdoor perturbation further comprises ensuring that potential backdoor perturbations for each respective target class achieve a pre-specified minimum misclassification rate among perturbed clean samples.

11. The computer-implemented method of claim 1,
   wherein the data samples are images; and wherein the backdoor perturbation comprises at least one of imperceptible modification of a few pixels in the images, most of the pixels in the images, and all of the pixels in the images.

12. The computer-implemented method of claim 11, wherein the data-sample images comprise at least one of human faces, human fingerprints and human irises; and wherein the trained classifier is part of an access-control system.

13. The computer-implemented method of claim 1, wherein determining whether the trained classifier has been backdoor-poisoned is based on statistical significance assessment, such as p-values of null distributions based on the set of sizes of the estimated potential backdoor perturbations.

14. The computer-implemented method of claim 1, wherein estimating a potential backdoor perturbation comprises using a gradient ascent technique to maximize a differentiable objective function, with respect to the potential backdoor perturbations, that is an approximation of the non-differentiable count of misclassified perturbed clean samples.

15. The computer-implemented method of claim 1, wherein each potential backdoor perturbation constitutes a vector whose size is measured using a p-norm, including the Euclidean norm (2-norm).

16. A non-transitory computer-readable storage medium storing instructions that when executed by a computer cause the computer to perform a method for detecting backdoor poisoning of a trained classifier, the method comprising:
   receiving the trained classifier, wherein the trained classifier maps input data samples to one of a plurality of predefined classes based on a decision rule that leverages a set of parameters that are learned from a training dataset that may be backdoor-poisoned;
   receiving a set of clean (unpoisoned) data samples that includes members from each of the plurality of predefined classes;
   using the trained classifier and the clean data samples, estimating for each respective target class in the plurality of predefined classes at least one of a potential backdoor perturbation and a source class that is different from the respective target class such that incorporation of the potential backdoor perturbation into a subset of the clean data samples that are associated with the source class induces the trained classifier to misclassify the perturbed data samples to the respective target class;
   comparing the set of potential backdoor perturbations for the possible target classes in the plurality of predefined classes to determine a candidate backdoor perturbation based on perturbation sizes and misclassification rates; and
   determining from the candidate backdoor perturbation whether the trained classifier has been backdoor-poisoned.

17. A backdoor-detection system that performs backdoor-detection on a trained classifier, comprising:
   a processor;
   a memory; and
   a backdoor-detection mechanism;
   wherein at least one of the processor and the backdoor-detection mechanism are configured to receive the trained classifier and store parameters for the trained classifier and program instructions that operate upon the trained classifier in the memory;
   wherein the trained classifier maps input data samples to one of a plurality of predefined classes based on a decision rule that leverages a set of parameters that are learned from a training dataset that may be backdoor-poisoned;
   wherein the backdoor-detection system is configured to:
      load from the memory a set of clean (unpoisoned) data samples that includes members from each of the plurality of predefined classes;
      execute instructions that, using the trained classifier and the clean data samples, estimate for each respective target class in the plurality of predefined classes at least one of a potential backdoor perturbation and a source class that is different from the respective target class such that incorporation of the potential backdoor perturbation into a subset of the clean data samples that are associated with the source class induces the trained classifier to misclassify the perturbed data samples to the respective target class;
      compare the set of potential backdoor perturbations for the possible target classes in the plurality of predefined classes to determine a candidate backdoor perturbation based on perturbation sizes and misclassification rates; and
      determine from the candidate backdoor perturbation whether the trained classifier has been backdoor-poisoned.

* * * * *